United States Patent
Justin (10) Patent No.: US 11,901,749 B2
(45) Date of Patent: Feb. 13, 2024

(54) BALANCED DISCHARGE IN MULTI-BATTERY SYSTEM

(71) Applicant: Microsoft Technology Licensing, LLC, Redmond, WA (US)

(72) Inventor: Ajit Justin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 16/952,575

(22) Filed: Nov. 19, 2020

(65) Prior Publication Data

US 2022/0077693 A1  Mar. 10, 2022

Related U.S. Application Data

(60) Provisional application No. 63/076,044, filed on Sep. 9, 2020.

(51) Int. Cl.
*H02J 7/00* (2006.01)

(52) U.S. Cl.
CPC .......... *H02J 7/0016* (2013.01); *H02J 7/0048* (2020.01); *H02J 7/00302* (2020.01); *H02J 7/007182* (2020.01)

(58) Field of Classification Search
CPC .. H02J 7/0016; H02J 7/0048; H02J 7/007182; H02J 7/00302
See application file for complete search history.

(56) References Cited

U.S. PATENT DOCUMENTS

| | | |
|---|---|---|
| 5,486,749 A | 1/1996 | Brainard |
| 6,462,511 B1 | 10/2002 | Kwok et al. |
| 6,586,909 B1 | 7/2003 | Trepka |
| 7,191,077 B2 | 3/2007 | Mese et al. |
| 7,414,381 B2 | 8/2008 | Bucur et al. |
| 7,518,338 B2 | 4/2009 | Wang et al. |
| 7,598,706 B2 | 10/2009 | Koski et al. |

(Continued)

FOREIGN PATENT DOCUMENTS

| | | |
|---|---|---|
| CN | 1801571 A | 7/2006 |
| GB | 2506175 A | 3/2014 |

(Continued)

OTHER PUBLICATIONS

Clark "How a Balancer Works to Protect Batteries". https://medium.com/@electric.car.international/how-a-balancer-works-to-protect-batteries-edd21de0f271; Medium; Nov. 1, 2018 (Year: 2018).*

(Continued)

*Primary Examiner* — Drew A Dunn
*Assistant Examiner* — Pamela J Jeppson
(74) *Attorney, Agent, or Firm* — Holzer Patel Drennan (57) ABSTRACT

A multi-battery system implements operations to equalize discharge path impedance. The system includes first and second batteries of different capacities each coupled to a battery rail that supports source load electronics. The system includes charge control electronics configured to decouple the first battery from the battery rail when the discharge path of the first battery and the discharge path of the second battery have unequal impedance and to recouple the first battery to the battery rail when the discharge path of the first battery and the discharge path of the second battery have substantially equal impedance.

17 Claims, 5 Drawing Sheets

(56) References Cited

U.S. PATENT DOCUMENTS

| | | | |
|---|---|---|---|
| 8,154,249 B2 | 4/2012 | Johnson et al. | |
| 8,203,309 B2 | 6/2012 | Maegawa | |
| 8,659,182 B2 | 2/2014 | Iida et al. | |
| 8,674,658 B2 | 3/2014 | Wang et al. | |
| 9,385,543 B2 | 7/2016 | Kachi | |
| 9,461,482 B2 | 10/2016 | Cheng et al. | |
| 9,991,727 B2 | 6/2018 | Childress et al. | |
| 10,396,570 B2 | 8/2019 | Loncarevic | |
| 10,431,992 B2 | 10/2019 | Kawamura et al. | |
| 10,461,547 B2 | 10/2019 | Lee | |
| 10,551,894 B2 | 2/2020 | Li | |
| 10,671,149 B2 | 6/2020 | Grobelny et al. | |
| 10,778,013 B2 | 9/2020 | Kristjansson et al. | |
| 2005/0212489 A1 | 9/2005 | Denning et al. | |
| 2006/0066286 A1 | 3/2006 | Yokota et al. | |
| 2007/0247107 A1 | 10/2007 | Wang et al. | |
| 2009/0200986 A1* | 8/2009 | Kopera | H01M 10/486 320/134 |
| 2009/0251100 A1 | 10/2009 | Incledon et al. | |
| 2012/0038320 A1 | 2/2012 | Kabasawa et al. | |
| 2013/0154567 A1* | 6/2013 | Peterson | H02J 7/0063 320/126 |
| 2013/0335028 A1 | 12/2013 | Choi | |
| 2014/0203780 A1* | 7/2014 | Hu | H02J 7/0013 320/112 |
| 2014/0330463 A1* | 11/2014 | Jeong | H02J 7/0014 320/134 |
| 2015/0123595 A1 | 5/2015 | Hussain et al. | |
| 2015/0207339 A1 | 7/2015 | Hamburgen et al. | |
| 2015/0244190 A1* | 8/2015 | Yamamoto | H01M 10/441 320/126 |
| 2016/0190865 A1* | 6/2016 | Shin | H02J 7/34 307/65 |
| 2017/0141591 A1* | 5/2017 | Chen | H02J 7/0077 |
| 2017/0324256 A1 | 11/2017 | Mcmorrow et al. | |
| 2019/0214837 A1* | 7/2019 | Kristjansson | H02J 7/04 |
| 2019/0229543 A1* | 7/2019 | Kristjansson | G01R 31/379 |
| 2019/0288537 A1 | 9/2019 | Blaser | |
| 2019/0356137 A1 | 11/2019 | Balarajashetty | |
| 2020/0119563 A1* | 4/2020 | Hale | H02J 7/0047 |
| 2020/0203961 A1* | 6/2020 | Flowers | H02J 7/0013 |

FOREIGN PATENT DOCUMENTS

| | | |
|---|---|---|
| IN | 201811034645 A | 3/2020 |
| WO | 2014156041 A1 | 10/2014 |

OTHER PUBLICATIONS

"Office Action Issued in Indian Patent Application No. 202047026046", dated Apr. 1, 2022, 6 Pages.

"International Search Report and Written Opinion Issued in PCT Application No. PCT/US21/033282", dated Sep. 8, 2021, 11 Pages.

Barsukov, Yevgen., "Battery Cell Balancing: What to Balance and How", In Journal of Texas Instruments, 2009, 8 Pages.

"International Search Report and Written Opinion Issued in PCT Application No. PCT/US18/066341", dated Mar. 11, 2019, 11 Pages.

"How to Charge Lead Acid Marine and RV Batteries in Parallel", Retrieved From: https://web.archive.org/web/20170316213447/http://www.impactbattery.com/blog/tutorials/how-to-charge-marine-and-rv-batteries-in-parallel, Mar. 16, 2017, 4 Pages.

"How-To: Parallel Charging", Retreived From: https://web.archive.org/web/20120108063234/http:/www.tjinguytech.com/charging-how-tos/parallel-charging, Jan. 8, 2012, 6 Pages.

"Final Office Action Issued in U.S. Appl. No. 15/867,028", dated Oct. 4, 2019, 13 Pages.

"Non Final Office Action Issued in U.S. Appl. No. 15/867,028", dated May 16, 2019, 12 Pages.

"Non Final Office Action Issued in U.S. Appl. No. 15/867,028", dated Mar. 12, 2020, 14 Pages.

Badam, et al., "Software Defined Batteries", In Proceedings of the 25th Symposium on Operating Systems Principles, Oct. 4, 2015, pp. 215-229.

Linn, Allison, "A Laptop Battery System that Knows your Habits and Lasts a Lot Longer", Retrieved From: https://blogs.microsoft.com/ai/a-laptop-battery-system-that-knows-your-habits-and-lasts-a-lot-longer/, Oct. 2, 2015, 2 Pages.

"First Office Action and Search Report Issued in Chinese Patent Application No. 201880086119.1", dated Mar. 7, 2023, 22 Pages.

"Second Office Action Issued in Chinese Patent Application No. 201880086119.1", dated Aug. 21, 2023, 5 Pages.

"Third Office Action Issued in Chinese Patent Application No. 201880086119.1", dated Dec. 1, 2023, 5 Pages.

\* cited by examiner

BALANCED DISCHARGE IN MULTI-BATTERY SYSTEM

CROSS-REFERENCE TO RELATED APPLICATIONS

The present application claims priority to U.S. Provisional Patent application No. 63/076,044, entitled "Balanced Discharge in Multi-Battery System," filed on Sep. 9, 2020, which is hereby incorporated by reference for all that it discloses or teaches.

BACKGROUND

Including multiple batteries in an electronic device is one way to extend run-time capacity. These systems present unique challenges with respect to battery power management.

SUMMARY

According to one implementation, a system disclosed herein includes a first battery and a second battery that each have a discharge paths coupled to a shared battery rail supporting source load electronics. The system includes charge control electronics configured to decouple the first battery from the battery rail when the discharge path of the first battery and the discharge path of the second battery have unequal impedance and to recouple the first battery to the battery rail when the discharge path of the first battery and the discharge path of the second battery have substantially equal impedance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

If batteries in a same device have disparate charge characteristics (e.g., different capacities), battery life preservation may depend on regular operation of the batteries at different charge and/or discharge rates. In some systems, unequal battery discharge can lead to circuit brown-outs. Additionally, unequal battery discharging may lead to unequal battery cycling (e.g., one battery may be subjected to a larger number of charge/discharge cycles than another). Since battery lifetime is tightly correlated with total charge/discharge cycles, this unequal battery cycling may age one battery more quickly than another leading to premature battery failure.

The herein disclosed technology provides solutions for impedance balancing within the discharge paths of two or more batteries with disparate charge characteristics within a same electronic device. As used herein, two batteries are referred to as "disparate" or "having disparate charge characteristics" when characterized by charge profiles that are substantially non-identical, such as when the batteries have different capacities, and/or physical characteristics that may lead to different relative states of charge when simultaneously integrated within a same electronic device. For example, two batteries have disparate charge characteristics if they have different capacities, are at different states of charge, and/or are physically located in proximity to loads (and thus impedance) so as to discharge at different rates (thereby leading to different states of charge).

Ensuring that batteries discharge along equal or substantially equal impedance paths can help to equalize battery cycling to ensure that batteries with disparate charge characteristics have approximately equal lifetimes. Likewise, discharge path impedance balancing can help to prevent system brown-outs caused by large variations in the relative charge levels of batteries jointly supporting a load. If, for example, a first battery proximal to a source load has a particularly low state of charge relative to that of a secondary battery located further away from the source load, there exists a risk that a large load transient may overwhelm the first battery and cause a shared battery rail voltage to drop to a critically low level before the second battery is able to respond. In such case, the system may be rendered non-functional until the batteries are recharged.

Figure 1:
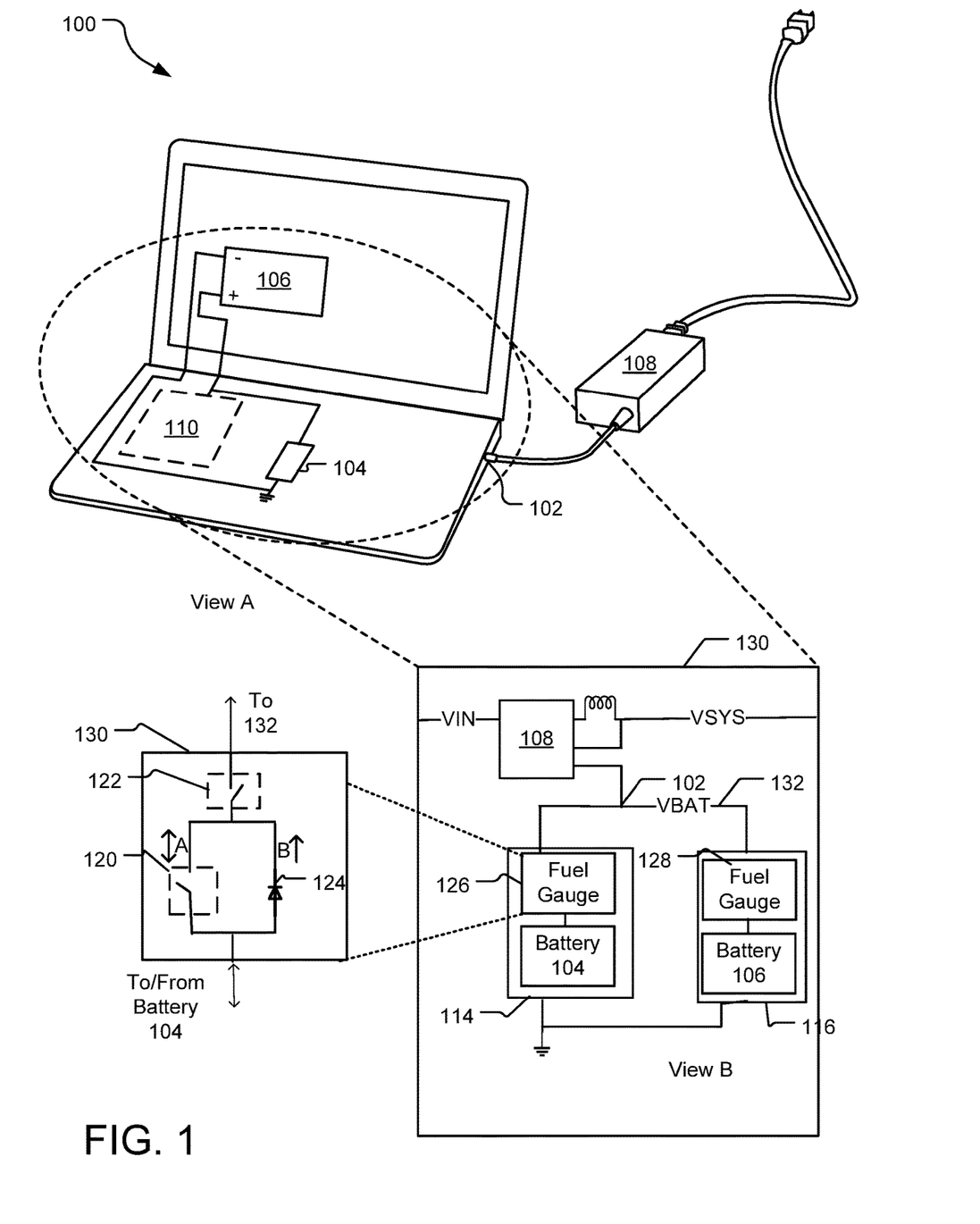
FIG. 1 illustrates an example electronic device for balancing discharge path impedance in a multi-battery system.

FIG. 1 illustrates an example electronic device for balancing discharge path impedance in a multi-battery system. The electronic device 100 is shown to be a laptop computer in FIG. 1, but may, in other implementations, be any battery-powered electronic device. In one implementation, the electronic device is a device that folds in half at a central hinge, allowing first and second portions to be stacked on top of one another. For example, the first portion may include a display (e.g., a tablet) while the second portion includes a keypad. Alternatively, the first portion may be a first display and the second portion may be a second display (a dual screen device that folds about a central hinge).

As shown in View A, the electronic device 100 includes source load electronics 110 (e.g., a processor, memory, display, speakers, wireless circuitry) that is supported by two batteries (a first battery 104 in a battery pack 114 and a second battery 106 in a battery pack 116) with disparate charge characteristics that are arranged in parallel. The two batteries are rechargeable through a single charging node 102 when connected to an external power source, such as to a charger 108 plugged into an outlet or external, portable power supply.

In different implementations, the first battery 104 and the second battery 106 may vary in type, charge capacity, and positions within the electronic device 100. In one implementation, the device folds across a hinge and one are more batteries are included within portions of the device on each side of the hinge. For example, a small capacity battery may be located in the first portion of the device proximal to a majority of the load-drawing electronics (e.g., memory, processor) while a larger capacity battery may be located in the second portion of the device where there is more available real estate for battery storage. The two batteries may be connected to one another in parallel along a voltage rail that abridges the hinge, as generally shown in FIG. 1.

In one example implementation, the first battery 104 and the second battery 106 are of a same voltage type (e.g., either both single-cell packs (1S), such as 3-4.4V packs, or both dual-cell (2S), such as 6V-8.8V packs). The battery packs 114, 116 have independent fuel gauges 126, 128, which may be understood to include control circuitry such as a microprocessor, memory, and firmware functional to control aspects of battery charging and/or discharging, such as by monitoring battery parameters (e.g., voltage, charge state, and temperature) and communicating changes in battery parameters to other control electronics such as electronics included within the charger 108, within other fuel gauges, and/or electronics situated elsewhere on a motherboard of the electronic device 100.

In one implementation, the first battery 104 has a smaller capacity than the second battery 106 and the second battery 106 is situated closer to the source load electronics 110 than the first battery 104. Due to the proximity to the source load electronics 110, current flowing between the second battery 106 and the source load electronics 110 is subjected to a greater amount of impedance as compared to current flowing between the first battery 104 and the source load electronics 110. For this reason, the use of the first battery 104 to assist with load transients can dramatically improve source impedance while also supplying more total capacity during runtime. In systems where the first battery 104 is smaller (of lower capacity) than the second battery 106, depletion of the smaller battery can risk a system brown-out, rendering the system unable to operate until recharged. As the impedance path difference increases between the larger battery (placed further from the loads) and smaller battery, the effect of the small battery depleting more quickly becomes more pronounced.

According to one implementation, both of the battery packs 114, 116 includes charge/discharge electronics 130 operated by the associated fuel gauge. Since these components may be the same or similar, the charge/discharge electronics 130 are described below with reference to the battery pack 114 without reference to the battery pack 116.

By example and without limitation, the charge/discharge electronics 130 are shown to include an overcharge protection mechanism 120 and a discharge interrupt mechanism 122 that may, in different implementations, be implemented in a variety of different ways. In FIG. 1, these components are illustrated as on/off switches to convey a primary functionality that is served by each. In general, the overcharge protection mechanism 120 functions to prevent harm to the battery as a result of over-charging. The overcharge protection mechanism 120 is controlled by electronics in the fuel gauge 126 to selectively introduce high impedance at times when a risk of battery-overcharging is high (e.g., when "overcharge risk criteria" are satisfied). In contrast, the discharge interrupt mechanism 122 functions to prevent discharging of the battery 104 at times when the two batteries have unequal impedance discharge paths. This is discussed in further detail below.

In addition to the overcharge protection mechanism 120 and the discharge interrupt mechanism 122, the charge/discharge electronics 130 further include a primary current path segment (A) and a secondary current path segment (B). The duplicate current path (e.g., secondary current path (B)) functions as a back-up discharge path for the battery to facilitate system load support at times when the overcharge protection mechanism 120 disrupts the primary current path segment (A) to safe the battery 104 when there exists a high risk of battery overcharge. When the overcharge protection mechanism 120 is disabled (e.g., presenting low impedance), the primary current path segment (A) serves as a current path to support both charging and discharging. The secondary current path segment (B) is favored when the overcharge protection mechanism 120 is enabled (e.g., presenting high impedance). The secondary current path segment (B) permits discharge of the battery 104 but does not permit charging due to the inclusion of a directional diode 124. The overcharge protection mechanism 120 functions to selectively toggle the primary current path segment (A) between an "on" state (by presenting high or infinite path impedance) and an "off" state (by removing such impedance).

At a given time, regardless of whether the primary current path segment (A) is on or off, the primary current path segment (A) and the secondary current path segment (B) present different amounts of impedance due to presence of the diode 124 along the secondary path. Therefore, current discharges from the for the first battery 104 along a discharge path that includes either the primary current path segment (A) or the secondary path segment (B), depending on which has lower impedance.

As used herein, "discharge path" refers to a lowest-impedance available path for current discharge between a battery (e.g., either the first battery 104 or the second battery 106) and a shared battery rail 132 at a select point in time. In the example of FIG. 1, the fuel gauge 126 is configured to selectively disable the overcharge protection mechanism 120 (e.g., by closing a switch or presenting low impedance), thereby configuring the discharge path to include primary current path segment (A). Likewise, the fuel gauge 126 is configured to selectively enable the overcharge protection mechanism 120 (e.g., by opening a switch or presenting high impedance) to configure the discharge path to include the secondary current path segment (B).

When the overcharge protection mechanism 120 closed, the primary current path segment (A) has a lower impedance than the secondary current path segment (B) due to the presence of the diode 124 which presents a small resistance. For example, the diode 124 may present a path impedance that causes a voltage drop on the order of 500 mV or higher. Thus, the primary current path segment (A) is the favored discharged path whenever the overcharge protection mechanism 120 is closed. When the overcharge protection mechanism 120 is open (e.g., presenting a very large impedance in the primary current path (A)), the secondary current path segment (B) becomes the favored discharge path.

In one implementation where both the first battery 104 and the second battery 106 include the charge/discharge electronics 130, a discharge path of the first battery 104 has an impedance equal or substantially equal to impedance of a discharge path of the second battery 106 provided that the overcharge protection mechanism 120 is in the same state for both batteries (e.g., the overcharge protection mechanism 120 is either enabled for both batteries or disabled for both batteries). When the overcharge protection mechanism 120 is enabled, the secondary current path segment (B) becomes part of the discharge path for the associated battery. The secondary current path segment (B) for the first battery 104 has an impedance equal or substantially equal to the impedance of a secondary current path segment (B) for the second battery 106.

When the overcharge protection mechanism 120 is disabled, the primary current path segment (A) becomes part of the discharge path for the associated battery. The current path segment (A) for the first battery 104 has an impedance that is equal or substantially equal to the impedance to that of the primary current path segment (A) for the second battery 106.

As used herein, "substantially equal impedance" refers to an impedance mismatch that is less than or equal to an amount sufficient to cause a voltage drop differential between the two paths that is on the order of 200 mV or greater when batteries are operated within the normal range of recommended operational battery parameters. The term "unequal impedance" is used herein to refer to values that are neither equal nor substantially equal. Per the above definitions, impedance along two paths may be said to be "substantially equal" when a slight mismatch exists (e.g., an impedance mismatch that is sufficient to cause a voltage drop differential on the order of 100-200 mV). For example, the secondary current path segment (B) for the first battery 104 and the secondary current path segment (B) for the secondary battery 106 may have an impedance mismatch that causes a voltage differential on the order of 100-200 mV, such as may be the case when the two batteries have differences in internal battery impedance. In one implementation, differences in internal battery impedance are corrected for by a current limiter (not shown) that is in-line with one of the batteries.

When the overcharge protection mechanism 120 is disabled (e.g., presenting low impedance) for one of the system batteries and closed for another, there exists a state of unbalanced impedance between the discharge path for the first battery 104 and the discharge path for the second battery 106. For example, when the overcharge protection mechanism 120 is closed for the first battery 104, the discharge path of the first battery 104 includes the primary current path (A). If, at the same time, the overcharge protection mechanism 120 is open for the second battery 106, the discharge path for the second battery 106 includes the secondary discharge path (B). These two discharge paths have unequal impedance due to the fact that one includes the diode 124 and the other does not. For simplicity, the term "unbalanced discharge path impedance" is used herein to refer to any scenario where impedance is unbalanced between two discharge paths (e.g., extending between a battery and shared battery rail) at a select point in time.

The scenario of unbalanced discharge path impedance presents a particular challenge in devices such as that of FIG. 1 where multiple batteries with disparate charge characteristics (e.g., different capacities) are coupled to a shared battery rail that supports source electronics. Absent preventative controls, a battery with a discharge path having lower impedance than a discharge path of another battery may temporarily assume full support of the source load electronics 110. Consequently, the battery with the higher impedance discharge path may not discharge at all under normal load conditions, leading to a scenario where one battery cycles faster than the other and eventually, prematurely fails before the other.

Additionally, if a smaller capacity battery is closer to the source load electronics 110 than a larger capacity battery and an impedance mismatch causes the smaller battery to discharge faster, this further presents a risk of circuit brown-out. If, for example, the first battery 104 is a smaller capacity battery at 5% charge while the second battery 106 is a larger capacity battery at 70% charge, the first battery 104 may be unable to alone support a sudden increase in the system load, causing a voltage drop on the shared battery rail 132. In this case, the second battery 106 may begin discharging but the impedance of the longer path between the source load electronics 110 and the second battery 106 causes a delay in the receipt of current at the load source, thereby shorting out the circuit and rendering the system unable to operate until the first battery 104 is recharged.

In one implementation, the electronic device 100 prevents unequal battery cycling and system brown-outs by implementing control actions with respect to a discharge interrupt mechanism 122, which is also shown included within the charge/discharge electronics 130. Specifically, the discharge interrupt mechanism 122 is controlled to ensure that the lower-capacity battery (e.g., the first battery 104) does not discharge current unless the currently-favored discharge path for each of the two batteries have equal or substantially equal impedance to one another.

If, for example, there exists a scenario when the overcharge protection mechanism 120 is disabled for the first battery 104 (selecting segment A) and enabled for the second battery 106 (selecting segment B), the fuel gauge 126 may decouple the first battery 104 from the shared battery rail 132 by selectively enabling the discharge interrupt mechanism 122. Selectively enabling the discharge interrupt mechanism 122 for the first battery 104 has the effect of decoupling the first battery 104 from the shared battery rail 132, thereby temporarily preventing the first battery 104 from discharging. When the overcharge protection mechanism 120 is later disabled for the second battery 106, the discharge path for the second battery 106 is altered to again include segment A, and impedance is substantially equalized along the discharge path of the first battery 104 and the second battery 106 (e.g., because both paths now include segment A). At this point in time when the impedance is substantially equalized, the discharge interrupt mechanism 122 may be disabled to reconnect the first battery 104 to the shared battery rail 132 and to again permit the first battery 104 to discharge.

In the above-described scenario, the first battery 104 is prevented from discharging at the start of each new charge cycle until the impedance is equalized on the discharge paths of the first battery 104 and the second battery 106. In the illustrated example, the discharge path impedance is equalized when either (1) the discharge path of both batteries includes segment A or (2) the discharge path of both batteries includes segment B.

Figure 2:
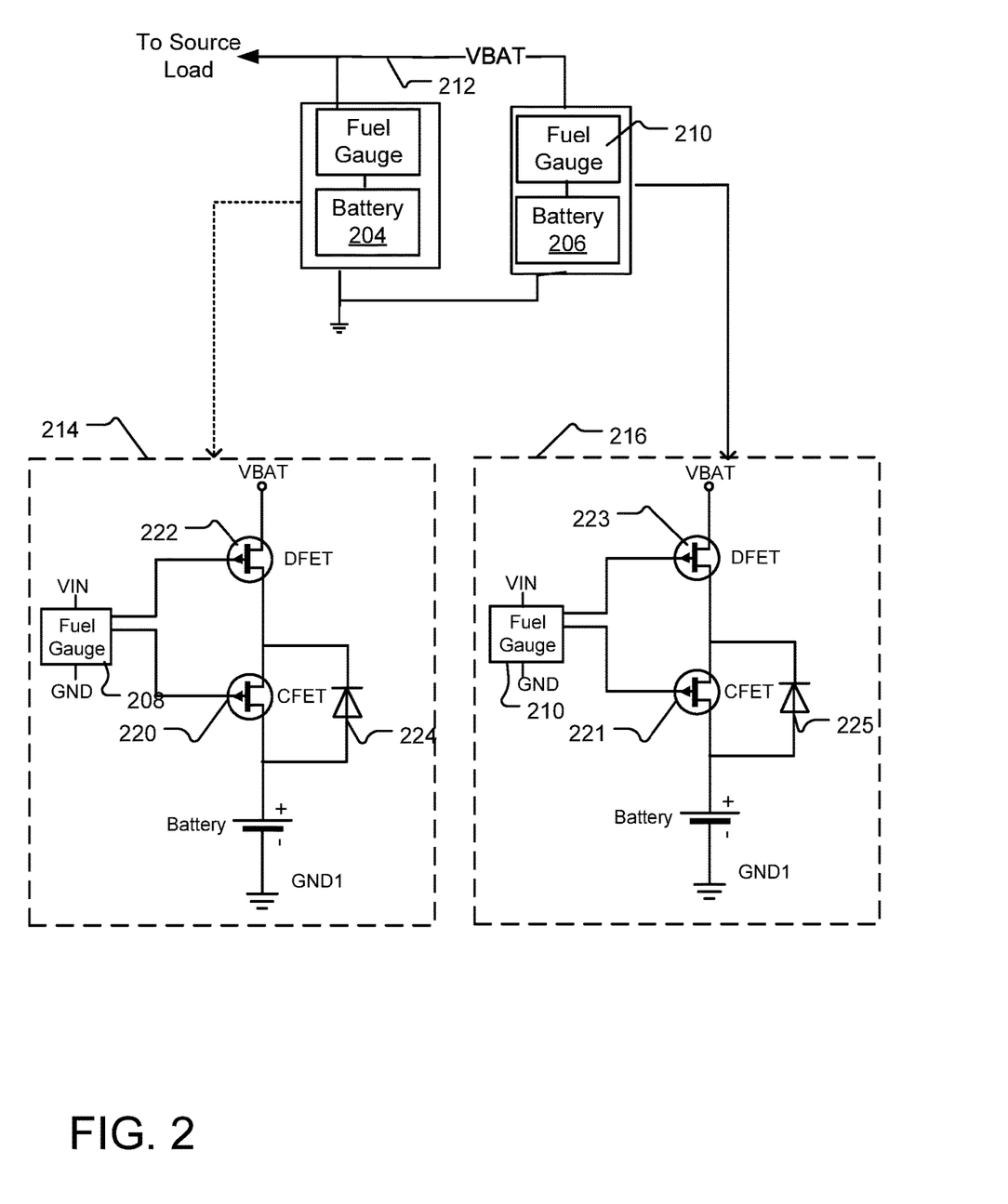
FIG. 2 illustrates aspects of another example electronic device that balances discharge path impedance to ensure equal battery cycling.

FIG. 2 illustrates aspects of another example electronic device 200 that performs actions for matching impedance along battery discharge paths to ensure equal battery cycling. The electronic device 200 includes at least two batteries connected in parallel to a shared voltage rail 212 supporting a source load. By example and without limitation, the electronic device 200 includes a first battery 204 that is nearer to the source load and of a lower capacity than a second battery 206. Each battery includes a fuel gauge (e.g., fuel gauges 208, 210) with integrated circuitry that controls a respective battery charge/discharge circuit (e.g., battery charge/discharge circuits 214, 216) to selectively charge and discharge the associated batteries.

By example and without limitation, the charge/discharge circuits 214, 216 each include a first FET referred to herein as a charge FET or "CFET" (e.g., CFETs 220, 221) that performs functionality the same or similar to that of the "overcharge protection mechanisms" described with respect to FIG. 1. Additionally, the charge/discharge circuits 214, 216 each include a second FET referred to herein as a discharge FET or "DFET" (e.g., DFETs 222, 223) that performs functionality the same or similar to that of the "discharge interrupt mechanisms" described with respect to FIG. 1.

The "on" state of CFET 220, 221 is "on" refers to the scenarios where overcharge protection is disabled. In the "on" state, the CFETs 220, 221 present low impedance and permit charging of the associated battery. When the CFETs 220, 221 are in the "on" state, discharge path for the associated battery is through the CFET to the shared voltage rail 212. When the CFETs 220, 221 are "off," charge protection is said to be "enabled" and these components present high impedance. Thus, when the CFETs 220, 221 are in the "off" state, the discharge paths for each of the batteries bypass the CFET and instead routes through a directional diode (e.g., diodes 224, 225). Likewise, when the DFET 222, 223 is "on" (e.g., presenting low impedance), the associated battery remains coupled to the shared voltage rail 208. By turning one of the DFETs 222, 223 "off", the associated battery is effectively decoupled from the shared voltage rail 212.

When a charger is connected to the shared voltage rail 212, battery charging occurs. Depending on the system load, such as whether the majority of the load is from either the left or right relative to the two batteries 204, 206, and also depending on system characteristics such as internal impedance of batteries and the relative distance between the source load and each of the batteries, one battery is expected to reach full charge more quickly than the other. By example and without limitation, the following example presumes that the first battery 204 is the battery to reach this full charge state more quickly.

In one implementation, "over-charge risk criteria" is defined with respect to the first battery 204 and the second battery 206. The over-charge risk criteria define system conditions under which the risk of overcharge to one of the batteries 204, 206 is high. The over-charge risk criteria may be satisfied when a battery charge level reaches into a defined high-charge zone or, alternatively, when the battery charge level reaches a set maximum charge threshold. The overcharge risk criteria may be identical or different (e.g., set individually) with respect to the first battery 204 and the second battery 206.

When the over-charge risk criteria is satisfied for a particular one of the batteries 204, 206, the associated fuel gauge 208 or 210 is configured to open the respective CFET 220 or 221. For example, the over-charge risk criteria may be deemed satisfied when the charge level of the battery 204 reaches a predefined "CFET open" limit. At this point in time, the CFET is opened to prevent the battery 204 from further charging.

The fuel gauges 208 and 210 may be further configured to close the respective CFET 220 or 221 when the charge level of the associated battery drops back down such that the over-charge risk criteria are no longer satisfied for the battery (e.g., when the battery charge drops back down below a defined "CFET" close limit). For example, the over-charge risk criteria may be set such that the CFET 220 is opened to prevent over-charge when a charge level of the first battery 204 reaches 100% and closed when the charge level drops back down from 100% to 99%.

Although the fuel gauges 208, 210 may enforce identical CFET open/close limits for the two batteries in some implementations, other implementations enforce different limits that may be selected to ensure that a same one of the CFETs 220, 221 always closes before the other. For example, the CFET 220 of the first battery 204 may be configured to open at 100% charge and close at 99% charge while the CFET 221 of the second battery 206 may be simultaneously configured to open at 100% charge and close at 95% charge. Provided that the first battery 204 is of smaller capacity, these settings may suffice to ensure that the CFET 220 is always closed for the first battery 204 before the CFET 221 is closed before the second battery 206. Stated differently, the charge protection is always disabled on the first battery 204 before being disabled on the second battery 206.

When the first battery 204 has the CFET that is guaranteed to close first, control actions for balancing impedance are simplified because they can be performed with respect to exclusively the battery with the CFET that closes first. That is, the battery with the CFET that closes first may be prohibited from discharging until the CFET of the other battery has closed, equalizing impedance along the two battery discharge paths.

According to one such implementation where limits are set to ensure that the CFET of the first battery 204 closes first (e.g., when the battery charge level falls from 100% to 99%), the fuel gauge 208 controls the DFET 222 of the first battery 204 to implement actions for balancing discharge path impedance. Thus, the DFET of the second battery 206 may be ignored for purposes of discharge impedance balancing or excluded from the charge/discharge circuit 216 entirely. Other implementations may perform discharge path impedance balancing control actions with respect to the DFETs of multiple batteries and/or other system components that perform similar functionality.

In the above-described implementation where the CFET 220 of the first battery 204 is guaranteed to close before the CFET 222 of the second battery 206, the fuel gauge 208 is configured to exert control over the DFET 222 to ensure that the first battery 204 (e.g., of smaller capacity) is decoupled from the shared voltage rail 212 whenever the CFET 220 closes while the CFET 221 is still open. If, for example, the fuel gauge 208 is configured to close the CFET 220 when the charge level of the first battery 204 drops from 100% to 99%, the fuel gauge 208 may selectively open the DFET 222 at the same time that the CFET 220 closes to temporarily decouple the first battery 204 from the shared voltage rail 212, thereby prevent discharging from the first battery 204 until such time that the CFET 221 of the second battery 206 has also closed.

If the source load draws current requiring battery support at this point in time while the DFET 222 of the first battery 204 is open and the CFET 221 of the second battery 206 is also open, the second battery 206 may discharge current through the diode 225 to support the load, bypassing the CFET 221. Thus, it is the larger capacity battery that supports the load during this time period while the first battery 204 is decoupled. This prevents the scenario where the smaller capacity battery supports the load and depletes more quickly—resulting in brown-outs and/or unequal battery cycling.

When the CFET 221 subsequently closes for the second battery 206 (e.g., after reaching 100% charge and dropping back down to 95% or other defined "CFET close" limit), overcharge protection is disabled and the discharge path impedance of the two batteries 204, 206 is again balanced since discharging current would now be directed through both of the CFETs 220, 221 (rather through one and around the other). Thus, responsive to the closure of the CFET 221 for the second battery 206, the fuel gauge 208 closes the DFET 222 of the first battery 204 to recouple the first battery 204 to the shared voltage rail 212, allowing both batteries to resume discharging along their impedance-balanced, natural discharge paths.

In the above example where the CFET 220 of the first battery 204 closes at a higher threshold (e.g., 99%) than the CFET 221 of the second battery 206 (e.g., closing at a threshold of 95%), it is ensured that the CFET of the first battery 204 closes first and that the first battery 204 begins discharging when the second battery 206 has a charge level at its respective "CFET close" threshold. For example, the first battery 204 always begins discharging when it has a charge level of 99% and when the second battery 206 has a charge level of 95%. In this scenario, it can be ensured that the first battery 204 and the second battery 206 drain in a balanced matter until both batteries reach 0% at approximately the same time each discharge cycle. Here, the term "approximately" implies that one battery may reach 0% while the other battery has no more than 5-10% charge remaining. These constraints ensure uniform battery cycling and uniform capacity loss as the batteries age, ultimately preventing premature battery failure of the smaller-capacity battery.

The above example is intended to convey one specific instance in which a smaller capacity battery may be selectively decoupled from and recoupled to a voltage rail shared by another battery in order to ensure that the smaller capacity battery does not discharge at times when there exists a discharge path impedance mismatch between the discharge paths of two or more batteries.

In various implementations, the discharge path impedance-matching actions described above with respect to the DFET 222 may be performed with respect to DFETs (or other components of similar function) within multiple different batteries in the same system and/or in systems with batteries arranged differently relative to one another and/or source load electronics than that shown herein.

Figure 3:
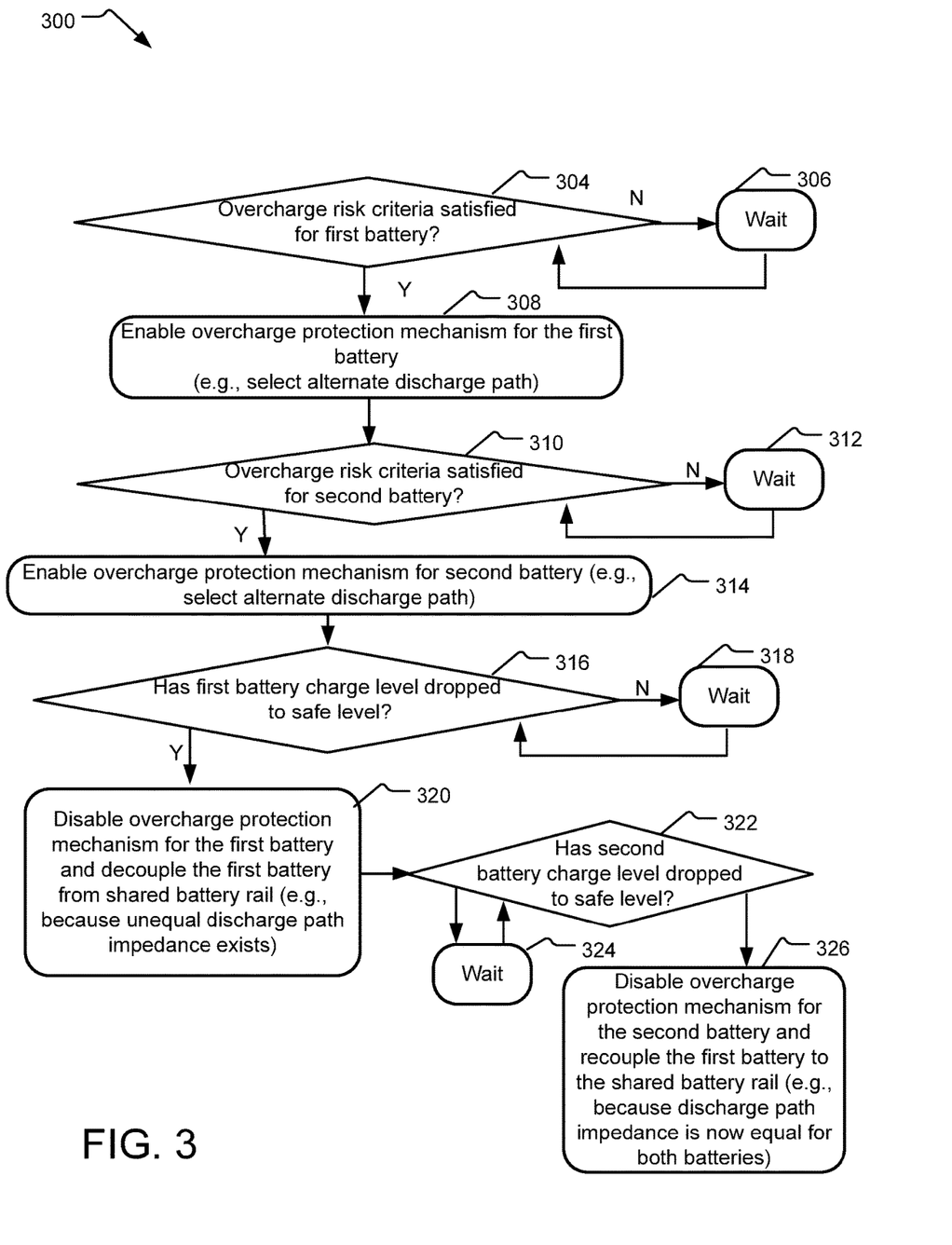
FIG. 3 illustrates example operations for balancing discharge in a multi-battery system.

FIG. 3 illustrates example operations 300 for balancing discharge in a multiple battery system. In one implementation, the multi-battery system includes batteries of different capacities connected in parallel to a same battery rail that supports source load electronics. Although some systems may implement the disclosed discharge balancing technology with respect to three or more batteries, the operations 300 are described with respect to an exemplary two-battery system.

The system implementing the operations 300 includes an overcharge protection mechanism that may be selectively enabled, with respect to either battery, to prevent overcharging of the battery. When enabled with respect to a particular battery, the overcharge protection mechanism prohibits the battery from charging further (e.g., to prevent overcharging), such as by introducing high impedance along a charge path. In the exemplary system performing the operations 300, enabling the overcharge protection mechanism with respect to a particular battery has the effect of temporarily alter the discharge path for the battery to include a path segment that increases overall path impedance relative to the original discharge path. When the overcharge protection mechanism is enabled for the first battery and disabled for the second battery, the two batteries have discharge paths with unequal impedance. When the overcharge protection mechanism is disabled for both batteries, the two batteries have discharge paths with substantially equal impedance.

According to one implementation, the system implementing the exemplary operations 300 is configured to enable the overcharge protection mechanism with respect to an individual one of the system batteries when the battery charge level reaches a first limit (e.g., very near to 100% charge) and configured disable the overcharge protection mechanism when the battery charge level has fallen back down to at or below a second limit. The system may set the first and second limits independently with respect to the two batteries so as to ensure that the overcharge protection is always disabled for a smaller-capacity battery of the two batteries before being disabled for the larger capacity battery of the two batteries. For example, the overcharge protection mechanism may be enabled (halting charging) of the first battery when the first battery reaches 100% charge and disabled when the charge level of the first battery drops back down to 99%. In the same system, the overcharge protection mechanism may be enabled for the second battery (the higher-capacity battery) when the second battery reaches 100% charge level and disabled when the charge level of the second battery drops down to 95%. The higher disable limit (99%) on the smaller-capacity battery simplifies the below-described impedance balancing actions because it limits the possible range of unequal discharge path impedance scenarios to those where the lower-capacity battery has the higher discharge path impedance.

When the charging cycle is nearing completion for the first battery (e.g., the lower-capacity battery), a determining operation 304 determines whether overcharge risk criteria is satisfied for the first battery. If, for example, the "enable" limit for the overcharge protection mechanism is at 100%, the overcharge risk criteria is satisfied when the first battery reaches a 100% charge level. If the overcharge risk criteria is not yet satisfied, a waiting operation 306 executes until such time that the overcharge risk criteria is satisfied for the first battery. The determining operation 304 functions to protect the battery by triggering actions to selectively prohibit charging of the first battery when the first battery is at a high risk of being charged to an unsafe level that may degrade the battery.

When the overcharge risk criteria is satisfied for the first battery, an enabling operation 308 temporarily enables the overcharge protection mechanism for the first battery. This prevents the first battery from charging further and also causes the first battery to temporarily favor a discharge path with higher impedance than the discharge path impedance of the first battery prior to the enabling operation 308.

Another determining operation 310 determines whether the overcharge risk criteria is satisfied for the second battery. The determining operation 310 functions similar to the determining operation 304 with respect to the second battery (e.g., by triggering actions to selectively prohibit charging of the second battery when the second battery is at a high risk of being charged to an unsafe level). If the overcharge risk criteria are not satisfied, another waiting operation 312 executes until such time that the overcharge risk criteria is satisfied for the second battery. This prevents the second battery from charging further and may also alter the discharge path for the second battery. When the overcharge risk criteria is satisfied for the second battery, an enabling operation 314 enables the overcharge protection mechanism for the second battery. This prevents the second battery from charging further and also causes the second battery to temporarily favor a discharge path with higher impedance than the discharge path impedance of the second battery prior to the enabling operation 314.

Another determination operation 316 determines whether the charge level of the first battery has dropped to a safe level such that the overcharge risk criteria is no longer satisfied. If, for example, the first battery's overcharge protection mechanism has a disable limit set to a 99% charge level, the overcharge risk criteria is deemed "no longer" satisfied when the charge level of the first battery has dropped back down to 99%. If the charge level of the first battery is still unsafe (above this limit), a waiting operation 318 executes until the charge level of the first battery has dropped to a safe level (below the limit).

Once the first battery charge level drops to a safe level, a disabling and decoupling operation 320 disables the overcharge protection mechanism for the first battery and also decouples the first battery from the shared battery rail. This decoupling is performed because the charge protection mechanism is still enabled for the second battery at this point in time and, consequently, the two batteries momentarily have unequal discharge path impedance. For example, decoupling the first battery from the shared battery rail may serve to prevent the first battery from discharging along a lower-impedance path than the second battery (e.g., leading to unequal battery cycling and risking system brown-outs).

Another determining operation 322 determines whether the charge level of the second battery has dropped to a safe level such that the overcharge risk criteria is no longer satisfied for the second battery. The determining operation 322 functions to selectively reverse the battery-safeing operations of the determining operation 316 at times when the second battery is no longer at a risk of being overcharge to an unsafe level.

If, for example, the "disable" limit for the second battery's overcharge protection mechanism is at 95% charge level, the overcharge risk criteria is deemed "no longer" satisfied when the second battery reaches the 95% charge level. If the charge level of the second battery is still unsafe (above this limit), a waiting operation 324 executes until the charge level of the second battery has dropped to a safe level (below the limit).

Once the second battery charge level drops to a safe level, a disabling and recoupling operation 326 disables the overcharge protection mechanism for the second battery. In one implementation, disabling of overcharge protection mechanism for the second battery alters the discharge path for the second battery such that the impedance of this discharge path is substantially equal to a discharge path impedance of the first battery. At this point in time, the first battery is recoupled to the shared battery rail.

Figure 4:
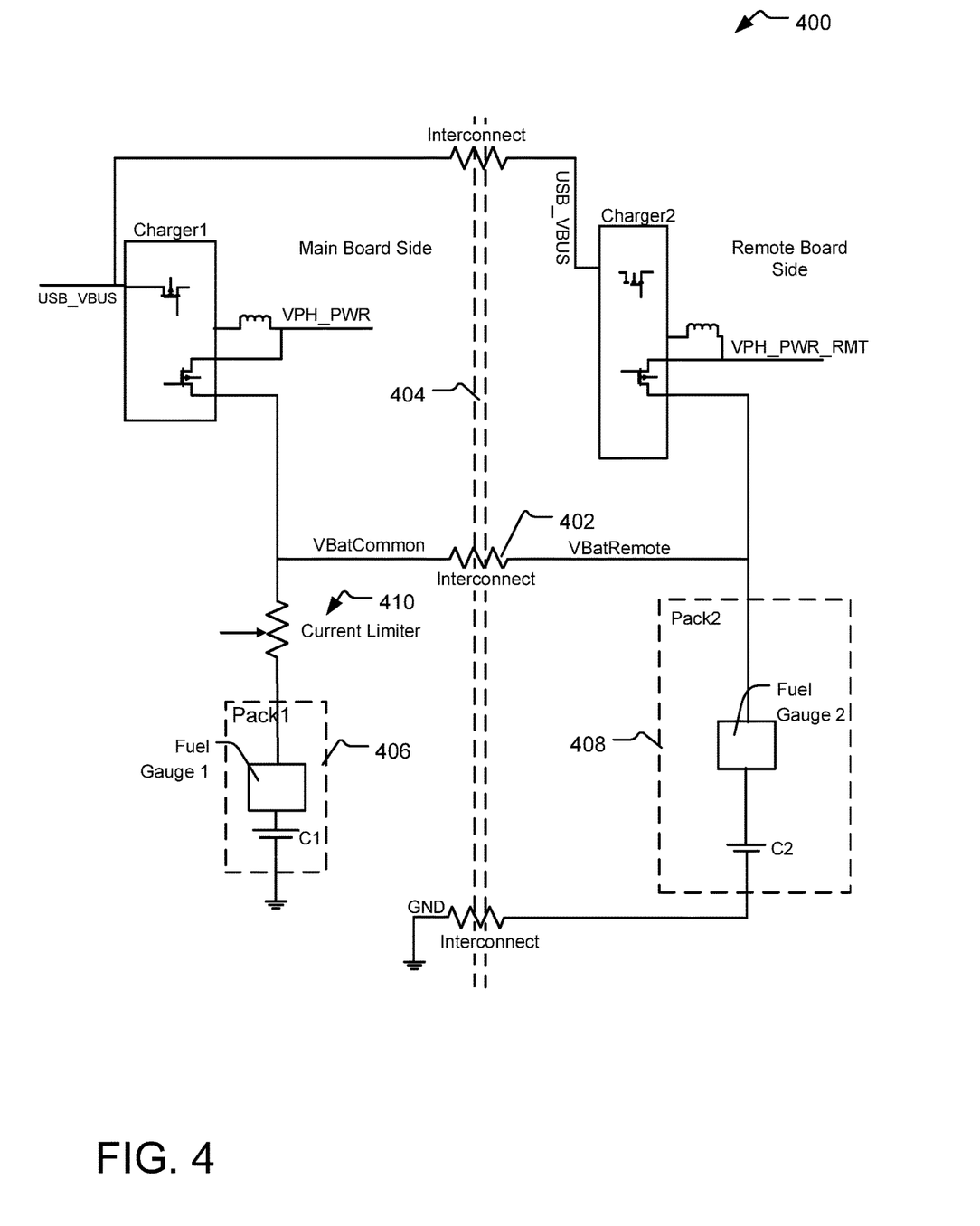
FIG. 4 illustrates a circuit diagram of another exemplary device that implements operations for balancing discharge impedance.

FIG. 4 illustrates a circuit diagram of another exemplary device 400 that implements operations for balancing discharge path impedance. Specifically, the device 400 includes a hinge 404 separating a first battery 406 and a second battery 408, where the first battery 406 is a lower capacity battery than the second battery 408. An interconnect 402 spans the hinge 404 to connect the two batteries to a shared voltage rail. Each of the batteries includes a fuel gauge that may control a battery charge/discharge circuit (not shown) to implement some or all of the operations for balancing discharge path impedance that described with respect to any of FIG. 1-3. A current limiter 410 is positioned in a charge/discharge path of the first battery 412. In one implementation, the current limiter 410 provides an adjustable impedance to limit the flow of current into and/or out of the first battery 406 in accord with predefined operational parameters. For example, the fuel gauge of the first battery 406 may perform circuit control operations to alter the impedance provided by the current limiter 410 based on currently-detected battery parameters (e.g., charge level, temperature) to ensure battery safety.

According to one implementation, the current limiter 410 is controlled to compensate for impedance differences between the discharge paths of the two batteries that arise as a result of differences in internal battery impedance. The current limiter 410 may also be controlled to correct for the impedance that the hinge 404 contributes to the shared battery rail such that current flowing between the first battery 406 and source load electronics is subjected to an equal or substantially equal total path impedance as the current flowing between the second battery 408 and the source load electronics. In one implementation, the current limiter 410 introduces a small additional impedance along the associated path (discharge path of the battery 406) to equalize path impedance relative to the discharge path for the battery 408. For example, the current limiter 410 may be controlled to introduce a path impedance that is equal to the sum of (1) the impedance of the hinge 404 and (2) the internal impedance difference of the two batteries.

Figure 5:
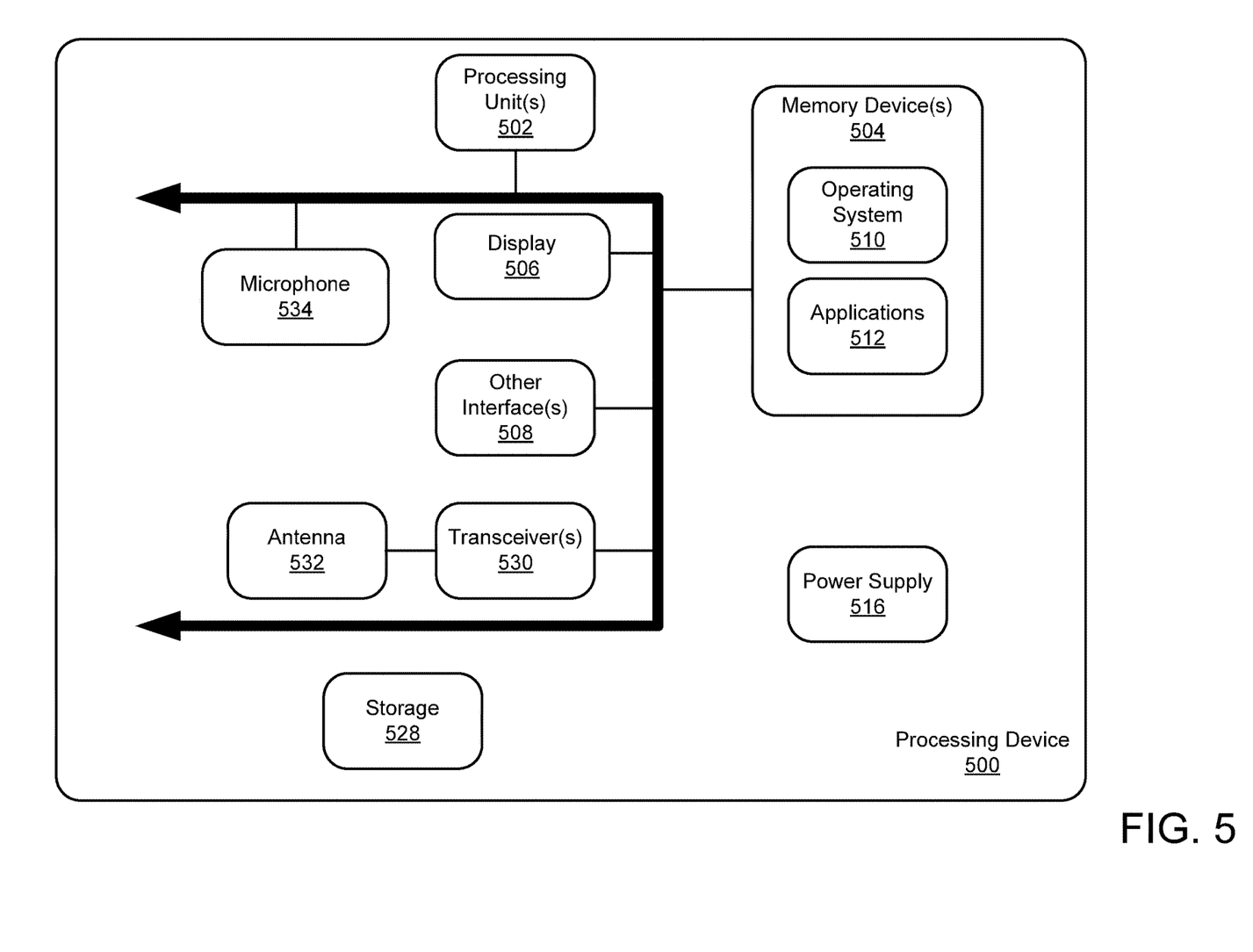
FIG. 5 illustrates an example block diagram of a processing device that may facilitate charge rate selection and/or alteration based on a dynamically-detected battery parameter.

FIG. 5 illustrates an example schematic of a processing device 500 that may implement a parallel battery circuit with disparate batteries and perform discharge path impedance balancing according the herein-disclosed technology. The processing device 500 includes one or more processing unit(s) 502 and one or more memory devices 504 that may be incorporated anywhere within the processing device 500 including within one or more battery fuel gauges. Additionally, the processing device 500 includes a display 506, and other interfaces 508 (e.g., buttons). The memory devices 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory devices 504 and is executed by the processing unit(s) 502, although other operating systems may be employed.

One or more applications 512, such as firmware of battery fuel gauges, is loaded in the memory device(s) 504 (e.g., memory within a battery fuel gauge) and by the processing unit(s) 502. The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, BlueTooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed. In an example implementation, a mobile operating system, various applications and other modules and services may be embodied by instructions stored in memory device(s) 504 and/or storage devices 528 and processed by the processing unit(s) 502. The memory device(s) 504 may include memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system disclosed herein includes a first battery with a discharge path coupled to a battery rail supporting source load electronics; a second battery with a discharge path coupled to the battery rail; and charge control electronics configured to decouple the first battery from the battery rail when the discharge path of the first battery and the discharge path of the second battery have unequal impedance. The charge control electronics are further configured to recouple the first battery to the battery rail when the discharge path of the first battery and the discharge path of the second battery have substantially equal impedance.

In an example system of any preceding system, the first battery has a lower capacity than the second battery and the control electronics are further configured to decouple the first battery from the battery rail to prevent the first battery from discharging when an impedance on the discharge path of the first battery is lower than an impedance on the discharge path of the second battery of larger capacity.

In still another example system of any preceding system, the time that the first battery is decoupled from the battery rail corresponds to a time when an overcharge protection mechanism is disabled with respect to the first battery and enabled with respect to the second battery. When enabled, the overcharge protection mechanism prevents charging.

In yet still another example system of any preceding system, impedance of the discharge path for the second battery is higher when the overcharge protection mechanism is enabled than when the overcharge protection mechanism is disabled.

In another example system of any preceding system, the control electronics include an overcharge protection mechanism configured to increase the impedance along the discharge path segment of the second battery responsive to determining that a charge level of the second battery has risen enough to satisfy overcharge risk criteria. Responsive to determining that a charge level of the second battery has dropped such that the overcharge risk criteria are no longer satisfied, the control electronics remove the impedance from the discharge path of the second battery and recouple the first battery to the battery rail.

In another example system of any preceding system, the charge control electronics are included within fuel gauges of the first battery and the second battery.

An example method disclosed herein includes decoupling a first battery from a battery rail at a time when a first impedance along a discharge path of a first battery is unequal to a second impedance along a discharge path of a second battery coupled to the battery rail. The method further includes recoupling the first battery to the battery rail at a subsequent time when impedance has substantially equalized along the discharge path of the first battery and the discharge path of the second battery.

In another example method of any preceding method, the time that the first battery is decoupled from the battery rail corresponds to a time when an overcharge protection mechanism is disabled with respect to the first battery and enabled with respect to the second battery, the overcharge protection mechanism preventing charging when enabled.

In yet another example method of any preceding method, impedance of the discharge path for the second battery is higher when the overcharge protection mechanism is enabled than when the overcharge protection mechanism is disabled.

In still another example method of any preceding method, the first battery has a lower capacity than the second battery and decoupling the first battery from the battery rail further comprises preventing the first battery from discharging when the first impedance on the discharge path of the first battery is lower than the second impedance on the discharge path.

In another example method of any preceding method, the method further comprises increasing the impedance along the discharge path segment of the second battery responsive to determining that a charge level of the second battery has risen enough to satisfy overcharge risk criteria. Responsive to determining that a charge level of the second battery has dropped such that the overcharge risk criteria are no longer satisfied, the impedance is removed from the discharge path of the second battery and the first battery is recoupled to the battery rail.

In yet still another example method of any preceding method, the method further comprises: opening a charge FET to increase impedance in a charge path of the first battery when a charge level of the first battery has risen to a first threshold and closing the charge FET to reduce the impedance from the charge path of the first battery when the charge level of the first battery has dropped to a second threshold. Decoupling the first battery from the battery rail further includes opening a discharge FET to disconnect the first battery from the battery rail responsive to the closure of the charge FET.

Another example method of any preceding method further comprises opening a charge FET to increase impedance in a charge path of the second battery when a charge level of the second battery has reached a third threshold and closing the charge FET to reduce the impedance in the charge path of the second battery when the charge level of the second battery has dropped to a fourth threshold. Recoupling the first battery to the battery rail further includes closing the discharge FET of the first battery to reconnect the first battery to the battery rail responsive to the closure of the charge FET in the charge path of the second battery.

In another example method of any preceding method, the second threshold and the fourth threshold are defined to ensure that the charge FET in the charge path of the first battery closes prior to the charge FET in the charge path of the second battery.

An electronic device disclosed herein includes a first battery with a discharge path coupled to a battery rail supporting source load electronics; a second battery with a discharge path coupled to the battery rail; and a means for preventing the first battery from discharging when a first impedance on a discharge path of the first battery is lower than a second impedance on a discharge path of the second battery.

In another electronic device of any preceding electronic device, the means for preventing the first battery from discharging further comprises charge control electronics that are further configured to decouple the first battery from the battery rail when the discharge path of the first battery and the discharge path of the second battery have unequal impedance and to recouple the first battery to the battery rail when the impedance is again substantially equal along the discharge path of the first battery and the discharge path of the second battery.

In still yet another electronic device of any preceding electronic device, the first battery has a lower capacity than the second battery and the control electronics are further configured to decouple the first battery from the battery rail to prevent the first battery from discharging when an impedance on the discharge path of the first battery is lower than an impedance on the discharge path of the second battery.

In still yet another electronic device of any preceding electronic device, the first battery is decoupled from the battery rail at a time when an overcharge protection mechanism is disabled with respect to the first battery and enabled with respect to the second battery, the overcharge protection mechanism preventing charging when enabled.

In yet another electronic device of any preceding electronic device, impedance of the discharge path for the second battery is higher when the overcharge protection mechanism is enabled than when the overcharge protection mechanism is disabled.

In yet another electronic device of any preceding electronic device, the control electronics are further configured to increase impedance along the discharge path of the second battery responsive to determining that a charge level of the second battery has risen high enough to satisfy overcharge risk criteria. Additionally, the control electronics are configured to remove the impedance from the discharge path of the second battery and recouple the first battery to the battery rail responsive to determining that a charge level of the second battery has dropped such that the overcharge risk criteria are no longer satisfied. An example system disclosed herein includes a means for decoupling a first battery from a battery rail at a time when a first impedance along a discharge path of a first battery is unequal to a second impedance along a discharge path of a second battery coupled to the battery rail. The system further includes a means for recoupling the first battery to the battery rail at a subsequent time when impedance has substantially equalized along the discharge path of the first battery and the discharge path of the second battery.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system comprising:
   a first battery with a first discharge path coupled to a battery rail supporting source load electronics;
   a second battery with a second discharge path coupled to the battery rail; and
   charge control electronics configured to:
      decouple the first battery from the battery rail when a first overcharge protection mechanism of the first battery is in a first state different from a second state of a second overcharge protection mechanism of the second battery, wherein a time that the first battery is decoupled from the battery rail corresponds to a time when the first overcharge protection mechanism is disabled and the second overcharge protection mechanism is enabled, the first overcharge protection mechanism preventing charging of the first battery when enabled and the second overcharge protection mechanism preventing charging of the second battery when enabled; and
      recouple the first battery to the battery rail when the first overcharge protection mechanism of the first battery and the second overcharge protection mechanism of the second battery are both in a same state that is either an enabled state or a disabled state.

2. The system of claim 1, wherein the first battery has a lower capacity than the second battery and the charge control electronics are further configured to decouple the first battery from the battery rail to prevent the first battery from discharging when an impedance on the first discharge path of the first battery is lower than an impedance on the second discharge path of the second battery of larger capacity.

3. The system of claim 1, wherein an impedance of the second discharge path for the second battery is higher when the first overcharge protection mechanism is enabled than when the first overcharge protection mechanism is disabled.

4. The system of claim 1, wherein the second overcharge protection mechanism is configured to:
   increase an impedance along the second discharge path of the second battery responsive to determining that a charge level of the second battery has risen enough to satisfy overcharge risk criteria; and
   responsive to determining that a charge level of the second battery has dropped such that the overcharge risk criteria are no longer satisfied, remove the impedance from the second discharge path of the second battery and recouple the first battery to the battery rail.

5. The system of claim 1, wherein the charge control electronics are included within fuel gauges of the first battery and the second battery.

6. A method comprising:
decoupling a first battery from a battery rail at a time when a first overcharge protection mechanism of the first battery is in a first state different from a second state of a second overcharge protection mechanism of a second battery coupled to the battery rail; and
recoupling the first battery to the battery rail at a subsequent time when the first overcharge protection mechanism of the first battery and the second overcharge protection mechanism of the second battery are both in a same state that is either an enabled state or a disabled state, wherein the time that the first battery is decoupled from the battery rail corresponds to a time when the first overcharge protection mechanism is disabled and the second overcharge protection mechanism is enabled, the first overcharge protection mechanism preventing charging of the first battery when enabled and the second overcharge protection mechanism preventing charging of the second battery when enabled.

7. The method of claim 6, wherein impedance of a discharge path for the second battery is higher when the second overcharge protection mechanism is enabled than when the second overcharge protection mechanism is disabled.

8. The method of claim 6, wherein the first battery has a lower capacity than the second battery and decoupling the first battery from the battery rail further comprises:
preventing the first battery from discharging when a first impedance on a first discharge path of the first battery is lower than a second impedance on a second discharge path of the second battery.

9. The method of claim 6, wherein the method further comprises:
increasing an impedance along a discharge path of the second battery responsive to determining that a charge level of the second battery has risen enough to satisfy overcharge risk criteria; and
responsive to determining that a charge level of the second battery has dropped such that the overcharge risk criteria are no longer satisfied, removing the impedance from the discharge path of the second battery and recouple the first battery to the battery rail.

10. The method of claim 6, further comprising:
opening a charge FET to increase impedance in a charge path of the first battery when a charge level of the first battery has risen to a first threshold;
closing the charge FET to reduce the impedance from the charge path of the first battery when the charge level of the first battery has dropped to a second threshold, wherein decoupling the first battery from the battery rail further includes opening a discharge FET to disconnect the first battery from the battery rail responsive to the closure of the charge FET.

11. The method of claim 10, further comprising:
opening a charge FET to increase impedance in a charge path of the second battery when a charge level of the second battery has reached a third threshold;
closing the charge FET to reduce the impedance in the charge path of the second battery when the charge level of the second battery has dropped to a fourth threshold, wherein recoupling the first battery to the battery rail further includes closing the discharge FET of the first battery to reconnect the first battery to the battery rail responsive to the closure of the charge FET in the charge path of the second battery.

12. The method of claim 11, wherein the second threshold and the fourth threshold are defined to ensure that the charge FET in the charge path of the first battery closes prior to the charge FET in the charge path of the second battery.

13. An electronic device comprising:
a first battery with a first discharge path coupled to a battery rail supporting source load electronics;
a second battery with a second discharge path coupled to the battery rail; and
a means for preventing the first battery from discharging when a first overcharge protection mechanism of the first battery is in a first state different from a second state of a second overcharge protection mechanism of the second battery, wherein the first battery is decoupled from the battery rail at a time when the first overcharge protection mechanism is disabled and the second overcharge protection mechanism is enabled, the first overcharge protection mechanism preventing charging of the first battery when enabled and the second overcharge protection mechanism preventing charging of the second battery when enabled.

14. The electronic device of claim 13, wherein the means for preventing the first battery from discharging further comprises:
charge control electronics are further configured to:
decouple the first battery from the battery rail when the first discharge path of the first battery and the second discharge path of the second battery have unequal impedance; and
recouple the first battery to the battery rail when the impedance is again substantially equal along the first discharge path of the first battery and the second discharge path of the second battery.

15. The electronic device of claim 14, wherein the first battery has a lower capacity than the second battery and the electronic device further includes a means for decoupling the first battery from the battery rail to prevent the first battery from discharging when an impedance on the first discharge path of the first battery is lower than an impedance on the second discharge path of the second battery.

16. The electronic device of claim 13, wherein impedance of the second discharge path for the second battery is higher when the second overcharge protection mechanism is enabled than when the second overcharge protection mechanism is disabled.

17. The electronic device of claim 15, wherein the electronic device further includes control electronics configured to:
increase impedance along the second discharge path of the second battery responsive to determining that a charge level of the second battery has risen high enough to satisfy overcharge risk criteria; and
responsive to determining that a charge level of the second battery has dropped such that the overcharge risk criteria are no longer satisfied, remove the impedance from the second discharge path of the second battery and recouple the first battery to the battery rail.

* * * * *